United States Patent [19]

Bursell

[11] 4,369,235

[45] Jan. 18, 1983

[54] ELECTROCHEMICAL CELL AND GAS DIFFUSION ELECTRODE FOR THE SAME

[75] Inventor: Martin S. O. Bursell, Solna, Sweden

[73] Assignee: SAB Nife AB, Sweden

[21] Appl. No.: 243,931

[22] PCT Filed: Jun. 25, 1980

[86] PCT No.: PCT/SE80/00176
§ 371 Date: Feb. 25, 1981
§ 102(e) Date: Feb. 25, 1981

[87] PCT Pub. No.: WO81/00032
PCT Pub. Date: Jan. 8, 1981

[51] Int. Cl.$^3$ .................................... H01M 12/00
[52] U.S. Cl. ................................ 429/27; 429/101
[58] Field of Search ................. 429/12, 13, 27, 28, 429/29, 101, 44, 40, 41, 42, 45, 57, 58, 59, 60

[56] References Cited

U.S. PATENT DOCUMENTS

| | | | |
|---|---|---|---|
| 2,213,429 | 9/1940 | Heise et al. | 429/27 |
| 2,907,809 | 10/1959 | Southworth et al. | 429/27 |
| 3,096,215 | 8/1963 | Voss et al. | 429/59 |
| 3,102,059 | 8/1963 | Harmer | 429/57 |
| 3,600,230 | 8/1971 | Stachurski et al. | 429/27 |
| 3,840,406 | 10/1974 | Depoix | 429/29 |

FOREIGN PATENT DOCUMENTS 48-7318741  8/1973  Japan ......................... 429/101

Primary Examiner—Donald L. Walton
Attorney, Agent, or Firm—Burns, Doane, Swecker & Mathis

[57] ABSTRACT

An electrochemical cell is described, as well as a gas diffusion electrode for the same. The electrode is of the type which is on an exterior surface provided with a catalyst for converting gas to electricity and on an interior surface with a hydrophobic material. The hydrophobic material comprises a cohesive porous plastics layer, which defines a closed gas space within the electrode, and which the electrolyte cannot enter, although the electrode is immersed therein. On the other hand, gas can be sucked into and can pass out from the space. When the electrode is partially immersed in the electrolyte, gas is automatically sucked from the atmosphere above the electrolyte level in the cell and into the gas space, due to the subpressure in the space occurring during operation. By reason of the capacity of the electrode it has been possible to make the cell according to the invention entirely closed off in relation to the surrounding atmosphere, which means a very simplified construction without gas conduits to the cell. The cell is especially utilizable as a metal/oxygen battery, fuel cell and metal oxide/hydrogen battery.

18 Claims, 3 Drawing Figures

ELECTROCHEMICAL CELL AND GAS DIFFUSION ELECTRODE FOR THE SAME

TECHNICAL FIELD

The present invention relates to an electrochemical cell and to a means for the manufacturing thereof, namely a gas diffusion electrode of a completely new type. A primary application of the electrochemical cell according to the invention, containing the new gas diffusion electrode, is in a battery of the type in which an oxygen electrode is utilized as the positive pole and in which the negative electrode usually consists of a metal such as, iron, cadmium, zinc or copper. However, the invention is not limited to the above-mentioned metal electrodes, and the negative electrode can also combust supplied fuels, such as hydrogen or methanol. Sources of electric current which consist of oxygen electrodes and metal electrodes are hereinafter referred to as metal/oxygen-cells (batteries), while the latter type of current source is called a fuel cell. Furthermore, the gas diffusion electrode according to the invention is used in connection with the electrochemical combustion of hydrogen. In this case the positive electrode is usually a metal oxide, and this third type of cell (battery) will be hereinafter designated metal oxide/hydrogen battery.

The invention is, however, not limited to the three types of cells mentioned above. The present invention can be applied to every electrochemical cell containing electrodes in contact with liquid electrolyte and where at least one of the electrodes is a gas diffusion electrode, which is exteriorly provided with a catalyst for converting gas to electricity, and which has an electrically conductive material as well as a hydrophobic material, at least internally. For the sake of simplicity, the invention will hereinafter be described in conjunction with metal/oxygen batteries without being limited thereto.

BACKGROUND ART

The advantage of metal/oxygen batteries compared with conventional batteries, is that a comparatively high energy density can be obtained, which is of great importance, e.g. if the battery is to be used for driving a vehicle. It has thus been found possible to obtain values of over 100 Wh/kg, which can be compared with about 60 Wh/kg for alkaline nickel oxide/iron batteries and about 40 Wh/kg for lead batteries.

A great drawback of the metal/oxygen cells manufactured up to now, is that an extensive auxiliary system is required to obtain a well-functioning cell. It has thus been found necessary to circulate the electrolyte, to pump oxygen or air past the gas sides of the oxygen electrodes, and to introduce a special charging electrode or other means for charging the metal electrode without destroying the oxygen electrode.

A summary of the systems which have been developed, or are under development, has been presented in "Journal of Power Sources" 2 (1977/78) pp. 287-296.

An oxygen electrode is disclosed in Swedish lay-open print No. 391,609, which is characterized in that water diffuses from the gas side towards the electrolyte during the charging phase. This is achieved by the construction of a dual layer electrode, where the layer on the gas side contains a hydrophobic material, preferably of polytetrafluoroethylene, and a catalyst for oxygen dissolution, while the layer towards the electrolyte side is hydrophilic. When built up into cells, the air electrodes are fixed into frames, and for constructing a battery, two adjacent cells form an air chamber for supplying the air electrodes with oxygen from the air.

In German Offenlegungsschrift No. 2,129,045 another metal/air or metal/oxygen battery is disclosed. In that battery a biporous oxygen (or air) electrode is used, which is layered with finely porous separators and metal electrodes to form an electrode package, where the gas electrodes are connected to a gas conduit at one or more places along the edges thereof.

The above-mentioned systems, however, have gas electrodes assembled into a pocket which is provided with gas conduits for supplying the pocket with oxygen or air from outside the pocket.

Another type of gas diffusion electrode is described in the article "Nouveau type d'electrode pour piles a combustible" published in "Advanced Energy Conversion", Vol. 7, pp. 159-166, Pergamon Press, 1967. The electrode is built up from finely-divided activated carbon bound together with the aid of a hydrophobic binder to a cohesive body with pores alternatingly filled with gas and with electrolyte. The gas is supplied from the surroundings by means of special gas supply means which can be applied anywhere on the electrode and which are described in more detail in French Pat. No. 1,433,558. Also in this case, however, there is the requirement that gas conduits, and thus special means, are applied on to the electrode for the supply of air or oxygen from outside.

DESCRIPTION OF THE PRESENT INVENTION

According to the present invention, it has been found possible to depart from the above-mentioned principles, and to manufacture gas diffusion electrodes with a substantially simplified construction. It is true that the electrode according to the invention may appear to be similar to the type of gas diffusion electrode last mentioned, but it is considerably simpler and cheaper to manufacture, gives enhanced energy density and, not least, an entirely new function. By the new construction of the gas diffusion electrode according to the invention, it has thus been found possible to provide a "self-breathing" electrode when the electrode is partially submerged in the electrolyte. In turn, this enables the construction of an electrochemical cell completely closed off from the surrounding atmosphere, i.e. a cell completely without gas supply conduits. One skilled in the art will easily understand what a substantial contribution to the state of the art the new electrochemical cell in accordance with the invention hereby constitutes. Cells consisting a plurality of interfoliated electrodes will be particularly simplified.

The electrochemical cell according to the invention is distinguished from the prior art in that the hydrophobic material of the gas diffusion electrode comprises a cohesive porous plastic layer with pores impermeable to liquids but permeable to gases, so that a closed space for gas is defined inside the electrode. Gas is able to diffuse to and from the gas space, but water or electrolyte do not have access to the gas space, even though the gas diffusion electrode is partially immersed into the electrolyte. In operation, a part of the electrode is in contact with gas present above the electrolyte, and the gas migrates via the gas permeable pores into the closed space for gas defined inside the electrode. Since the cell is closed in relation to the surrounding atmosphere, the gas diffusion electrode is adapted for automatically sucking gas into the gas space, due to the subpressure generated by the reaction when the cell is in operation.

Thus, at least in connection to the interior of the defined gas space, the gas diffusion electrode has a hydrophobic porous plastic material with a pore radius and a wetting angle relative to the electrolyte such that the pores are not filled with water or electrolyte. In this way so that the liquid cannot get through the plastic material to fill the gas space at the hydrostatic pressure occurring when the gas space is entirely or partially immersed in the electrolyte. However, at the same time, the pores are permeable to gas, primarily oxygen, for the passage of gas to and from the catalyst layer and to and from the gas in the space in the cell above the electrolyte level.

If the porous electrode, or gas space, is only partially immersed in the electrolyte, there is formed a communication link between the gas above the electrolyte and the gas space itself in the interior of the electrode. This is due to the electrode's construction and the properties of the hydrophobic material. Accordingly, if the atmosphere above the electrolyte consists of oxygen, the closed gas space which is closed off will also contain oxygen in the parts which are under the liquid level.

If the outsides of the gas space are provided with an electrically conductive material and a layer of catalyst suitable for oxygen electrodes, oxygen will diffuse through the pores in the walls of the gas space and be converted in the catalytically active layer when current is taken from the electrode. The gas pressure in the space will then decrease. In such circumstances it has been found that new oxygen is sucked into the gas space through the parts above the electrolyte level. The gas diffusion electrode will thus be "self-breathing", i.e. gas, in this case oxygen, does not need to be fed to the cell from outside. The cell according to the invention has good energy density and works completely satisfactorily as a system completely closed off from the surrounding atmosphere.

It has been found preferable to provide only the parts of the gas space which are below the electrolyte level with catalysts.

As already mentioned, the hydrophobic plastic material must have a pore radius and wetting angle such that it is capable of preventing the electrolyte from getting into the gas space, in spite of the subatmospheric pressure created in said space while the reaction is in progress. The selection of hydrophobic plastics material is not critical for the invention. For one skilled in the art there is no difficulty to select in each individual case such plastics material having the properties described above, i.e. to select suitable pore radius and wetting angle. Polytetrafluoroethylene (PTFE) can be mentioned as a non-restricting example of a suitable plastics material.

According to one embodiment of the cell in accordance with the invention, the entirely closed-off gas space in the gas diffusion electrode is formed as a pocket totally sealed about its periphery with walls in the form of films, or sheets, of the hydrophobic, porous plastics material, and the walls being kept apart by spacers.

According to another embodiment the totally sealed gas space is formed by a porous body, e.g. a plate, which is exteriorly coated with the hydrophobic porous plastic material.

When hydrogen is the gas used in the cell, for example, the pores inside the body in the last-mentioned embodiment can be the same size as the pores in the exterior plastics material. Usually, however, e.g. when the gas is oxygen, it is suitable to impart to the porous body greater sized pores than the pores in the exterior porous plastics material.

Still another embodiment of the cell according to the invention involves forming the peripherally totally sealed gas space from a porous body (e.g. a plate) of the hydrophobic plastics material with the body being outwardly coated with the catalyst. This signifies an advantageous embodiment, above all from the manufacturing aspect, enabling manufacture of a gas diffusion electrode at a low price.

With regard to the relationship between the surface of the closed gas space above and below the electrolyte level, respectively, this relationship is determined by the permeability of the plastics material to gas, the maximum currents it is desired to take from the electrode and the total height of the electrode. Generally, however, the part of the gas diffusion electrode above the electrolyte level should constitute at least 1% of the total area of the electrode. On the other hand, the upper limit is not equally as definite, since theoretically any amount at all could project above the electrolyte level. This will be, however, at the cost of energy density, and generally the upper limit should preferably not exceed 15%. For optimum results with regard to the surface of the gas diffusion electrode above the electrolyte level, the lower limit should be at least 5% and often at least 10% of the total area of the electrode. From the above it will be apparent that said surface is usually within the range of 1–15%, preferred ranges being 5–15% or 10–15%.

According to still another preferred embodiment of the electrochemical cell in accordance with the invention, increasing, preferably gradually increasing, hydrophobic properties are imparted to the electrode towards the end of the electrode, which is immersed in the electrolyte. Thus, in this way it is possible to compensate for the hydrostatic pressure of the electrolyte. Instead of, increasing the hydrophobic properties of the plastics material at increasing depths, one can further increase the hydrophobic properties of the catalyst layer in a corresponding way towards the electrode end immersed in the electrolyte. The embodiment with increasing hydrophobicity towards one end of the electrode is especially advantageous for very tall electrodes. However, even in the case with varying hydrophobicity, the portion of the electrode above the electrolyte level must have sufficient gas permeability, while at the same time being capable of excluding splashing electrolyte and condensed water drops.

In the case when the oxygen electrode in accordance with the invention, as described above, is used in a metal/oxygen battery, it must be possible to charge the metal electrode. The method of charging is not critical for the invention. If the electrically conductive and catalytic layer of the oxygen electrode has such properties that it withstands the generation of oxygen, the oxygen electrode can be used for charging. In other cases, a special charging electrode can be used. In this connection it may be mentioned that the Swedish Patent specification No. 357,104 discloses a method of charging a hybrid fuel cell. This method is distinguished from the present invention in that the Swedish Patent cited above discloses an auxiliary electrode and the oxygen electrode insulated from each other with the aid of a gas which is supplied under pressure to a space between said electrodes. Such methods complicate the battery cell substantially, and at the same time, reduce the energy density since more inactive components must be added.

A particularly preferable embodiment of the invention, especially as it relates to a closed cell, is to utilize the oxygen generated during charging, so that the oxygen can be used during subsequent discharging. Such a system is disclosed in the German Offenlegungsschrift No. 1,771,803. In this publication a special charging electrode is provided with means for leading away the oxygen generated during charging. As a result of the present invention, the technique disclosed in the above mentioned publication has also been substantially simplified, since the space above the electrolyte level serves as an oxygen reservoir. The size of the reservoir is determined by the metal/oxygen cell's metal electrode, since the oxygen quantity corresponds to a given quantity of ampere hours. In cells with relatively high capacity, it has been found suitable to pass the oxygen to a special chamber for compression.

In most cases, the metal electrode generates hydrogen gas during the latter part of charging. When hydrogen gas is mixed with oxygen there is the risk of explosion. However, in such a case, the electrochemical cell according to the present invention can be supplemented by a hydrogen-oxygen reactor, known per se. The real task of this reactor is to lower the content of hydrogen in the gas mixture developed from the cell or battery during charging to values which are below the limit of explosion for hydrogen-oxygen-water mixtures in the system in question. Many metal electrodes also generate hydrogen when they are discharged and when they stand unloaded. However, there are reactor embodiments which also take into consideration this situation.

The reactor, known per se, can be of the catalytic type or of the combustion type. The catalytic type can comprise a catalyst mass arranged inside the battery itself. The German Offenlegungsschrift No. 1,812,518 discloses a method of decreasing the quantity of gas generated during charging. It is known that metals from the platinum group can catalytically combust hydrogen in the presence of oxygen. In claim 6 there is disclosed an embodiment where the catalyst material is separated from the electrode chamber by means of a filter material. The publication does not disclose a method where one gas is purified from the other for subsequent storage of the purified gas. It is also possible to arrange the catalyst mass outside the battery and then, if required, during discharging and/or in an unloaded state, continuously or intermittently oxidize risky amounts of hydrogen or amounts thereof injurious to the function by circulating the gas mixture between the battery and the reactor. The oxygen gas necessary for oxidization is naturally obtained from the oxygen in the pressure vessel.

However, it is also possible to divide the catalyst mass, one portion being arranged within the battery while the other is arranged between the battery and the pressure vessel. The combustion reactor can be some suitable type of a gas combustor. The flame must not propagate backwards into the battery, and some kind of liquid trap can therefore be arranged between the battery and the burner. The combustion reactor can furthermore be combined with a catalytic reactor arranged after the former, to further reduce the content of hydrogen in the gas mixture, before it is compressed and passed to the pressure vessel. The product water formed in the hydrogen-oxygen reactor is recycled to the electrolyte in the simplest possible way.

In certain cases it can be suitable to provide the bottom of the closed gas space in the gas diffusion electrode with a hydrogen-oxygen catalyst to oxidize the hydrogen which can possibly accompany the oxygen and thereby be accumulated at the bottom of the space.

The corresponding characteristic features apply for the new gas diffusion electrode in accordance with the present invention as have been set forth above in conjunction with the electrochemical cell. The gas diffusion electrode according to the invention is distinguished in that the hydrophobic material constitutes a cohesive porous plastics layer with pores which are impermeable to liquid and permeable to gas, so that a peripherally totally sealed gas space is defined inside the electrode, and gas is able to diffuse from said space, which material does not allow the entrace of water or electrolyte.

The specially preferable embodiments of the peripherally totally closed gas space in the electrode have been described above, and therefore do not need to be repeated here. Furthermore, in the same way as has been mentioned above, the gas diffusion electrode in accordance with the invention preferably has gradually increasing hydrophobicity from one end to the other.

The invention will now be described in more detail while referring to drawing figures relating to special embodiments and certain preferred specific working examples.

DESCRIPTION OF THE PREFERRED EMBODIMENT

Figure 1:
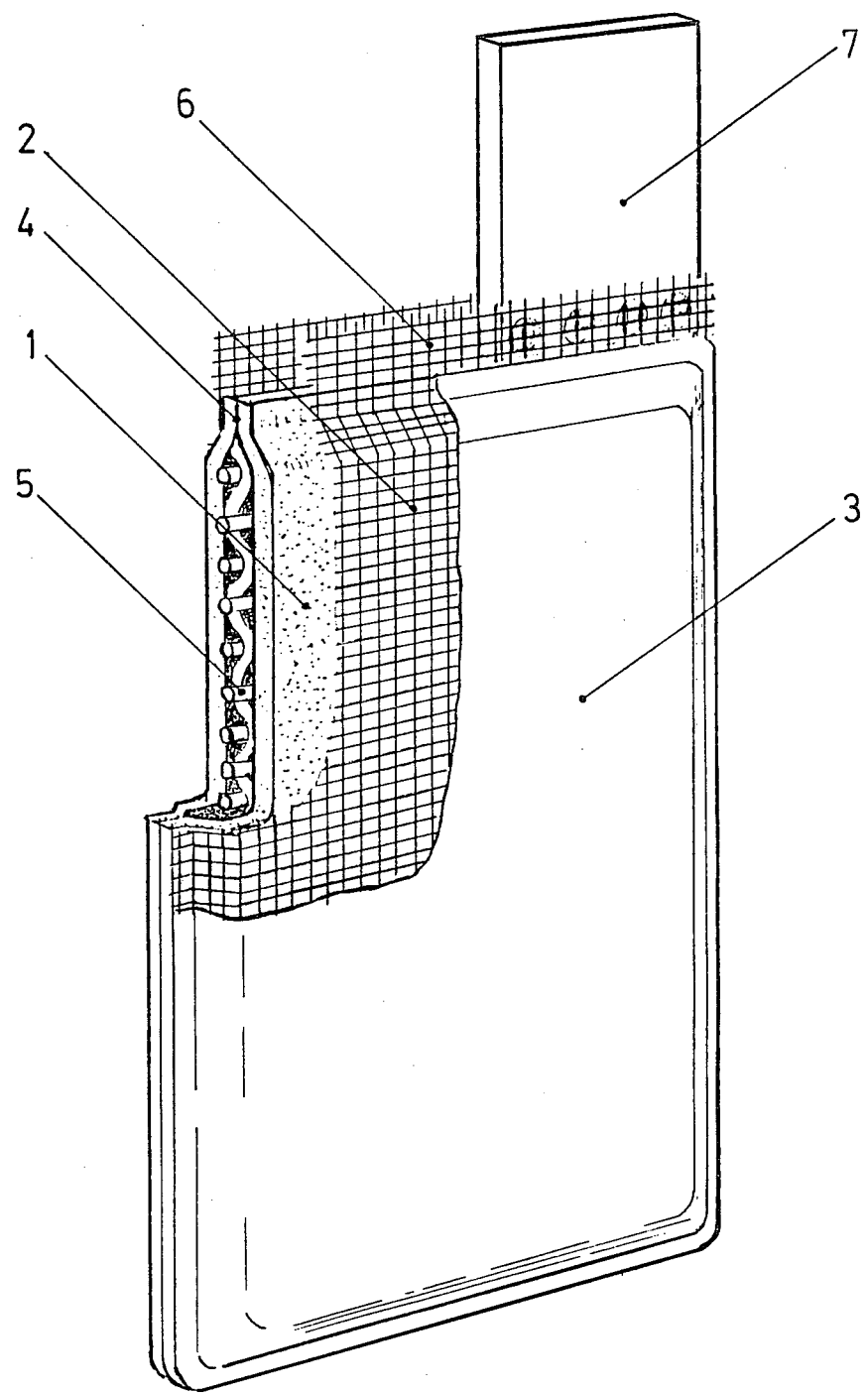
FIG. 1 is a cross section of an embodiment of a gas diffusion electrode in accordance with the present invention.

The electrode as illustrated in FIG. 1 has a closed pocket from two foils 1 welded to each other so as to totally seal the pocket about its periphery. An electrically conductive material in the form of a net 2 has been pressed into a the porous hydrophobic plastics foil 1. The outer layer of the electrode, 3 contains a catalyst. The pocket is formed by both foils 1 being heatwelded to each other at a welded joint 4. Inside the pocket there is a plastic net 5 which serves as a spacer. A part 6 of the electrically conductive material 2 extends above the electrode pocket and a current collector 7 is spotwelded to this part 6.

Figure 2:
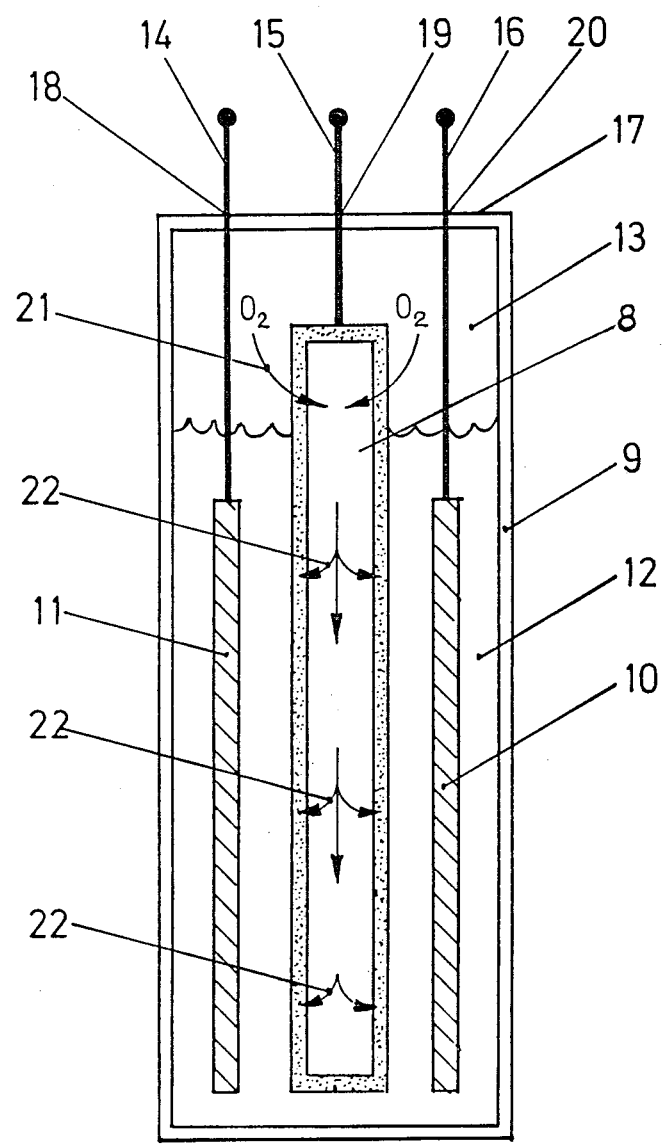
FIG. 2 is a cross section of a gas diffusion electrode in an electrochemical cell in accordance with the invention.

A gas diffusion electrode 8 in a cell 9, as illustrated in FIG. 2, has two nickel plates 10, 11 which are used as counter electrodes. An electrolyte 12 consists of 5 M potassium hydroxide solution, and the electrode 8 extends up into a gas space 13 containing pure oxygen gas. Current collectors 14,15,16 pass through the cell wall 17 via gas- and liquid-tight grommets 18,19 and 20, respectively.

When current is taken from the cell, oxygen is sucked into the oxygen electrode in the part which is above the electrolyte level, as indicated by the arrow 21. The oxygen diffuses through the porous hydrophobic layer and reacts in the catalytically active layer, as indicated by the arrow 22. The counter electrodes 10 and 11 simultaneously generate oxygen which is passed to the gas chamber 13.

Figure 3:
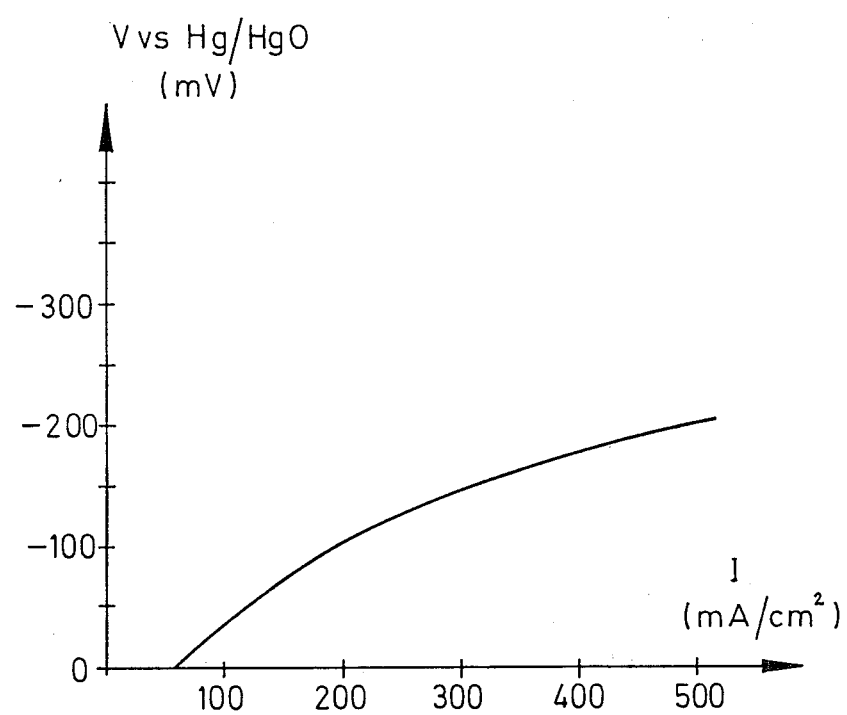
FIG. 3 is a graph of a current voltage obtained in testing the cell in FIG. 2.

When the cell illustrated in FIG. 2 was tested, the current-voltage graph was obtained which is illustrated in FIG. 3. Reproducible values were obtained under load for an extended time with varying current take-offs.

EXAMPLES

EXAMPLE 1

A gas diffusion electrode in accordance with the invention was manufactured according to the following method.

Sheets of PTFE were manufactured by sedimentation of a PTFE-suspension, subsequent to which the sediment was dried and sintered. Alternatively, commercially available sheets, e.g. Millipore ® or Gote-Tex ® can be used.

Nickel netting with the dimensions 100×200 mm was pressed into the sheets at a pressure of 300 kg/cm$^2$. The netting was somewhat longer than the sheet.

Two sheets provided with nettings were heat-welded along three sides with the nettings outside, thus forming a pocket. A metal spacer net was thrust down into the pocket and the fourth said was welded together.

The now closed pocket was provided with a catalytic layer by painting the outsides thereof with a mixture of a silver catalyst, a PTFE-suspension and a liquid pore forming agent. When the catalyst layer had dried, the whole pocket was heat treated for 30 minutes at 350° C., the catalyst layer sintering fast against the pocket. Current collectors were attached to the net portions extending above the pocket.

The gas diffusion electrode manufactured in this way was tested in a half cell with two nickel plate counter electrodes. 5 M Potassium hydroxide solution was poured into a height such that 2 cm or 10% of the pocket area projected up above the electrolyte level. The vessel was provided with a tightly closing cover and gas-tight current collector through-passages.

Before testing was started, the gas space was flushed clean from inert gases (primarily nitrogen) with oxygen via two valves. Flushing continued long enough for the interior of the pocket also to be free from inert gas. The gas in the half cell thus consisted of pure oxygen in this case.

During testing, the gas diffusion electrode was loaded with current for several hundred hours. The polarization graph according to FIG. 3 was not altered hereby.

The pocket was not filled with electrolyte although a gauge pressure of 2 m of water column was tried.

The vacuum in the pocket compared with the gas outside the pocket was measured to 20 mm of water column at a load of 100 mA/cm$^2$.

EXAMPLE 2

The same gas diffusion electrode as in Example 1, apart from the catalyst being platinum black, was manufactured and assembled into a half cell. The gas above and in the pocket was pure hydrogen in this case.

On loading, a voltage relative to a Hg/HgO-reference electrode of −875 mV at 200 mA/cm$^2$ was obtained.

EXAMPLE 3

A porous PTFE-plate with a thickness of 7 mm was manufactured by the same sedimentation method as in Example 1.

The plate was painted with catalyst in the form of platinum black (in a PTFE-suspension) and sintered.

Current collecting nickel net was pressed against the surface by a tight packing in a half cell.

The electrode was tested as a hydrogen electrode, a potential of −875 mV being obtained relative to the reference electrode at a load of 100 mA/cm$^2$.

I claim:

1. An electrochemical cell, comprising, an external cell housing which is closed in relation to a surrounding atmosphere, electrodes located within the cell housing in contact with a liquid electrolyte, at least one of the electrodes being a gas diffusion electrode, an external surface of the gas diffusion electrode being provided with both a catalyst for converting gas to electricity and an electrically conductive material, an internal surface of the gas diffusion electrode being provided with a hydrophobic material, the hydrophobic material of the gas diffusion electrode including a cohesive porous plastics layer having pores which are impermeable to liquid but permeable to gas, a gas space totally sealed about its periphery being defined inside the electrode, said gas diffusion electrode permitting gas to diffuse to and from said gas space and preventing entry of water or electrolyte into the gas space the gas diffusion electrode being partially immersed in the electrolyte and having a portion of the electrode in contact with gas in a gas chamber located within the cell housing above the electrolyte, the gas diffusion electrode being adapted for drawing gas from the gas chamber through the gas permeable pores into the gas space by a subpressure generated within the gas space during operation of the cell.

2. An electrochemical cell as claimed in claim 1, wherein the sealed gas space is formed as a pocket with walls in the form of sheets of the hydrophobic, porous plastic material, the walls being separated by spacer elements.

3. An electrochemical cell as claimed in claim 1, wherein the sealed gas space is formed by a porous body which is coated on an exterior surface with the hydrophobic porous plastics material.

4. An electrochemical cell as claimed in claim 3, wherein the porous body has greater sized pores than the pores in the exterior porous plastics material.

5. An electrochemical cell as claimed in any one of the preceding claims, wherein the gas diffusion electrode has increasing hydrophobicity towards an end which is immersed in the electrolyte to compensate for the hydrostatic pressure of the electrolyte.

6. An electrochemical cell as claimed in claim 1, wherein the portion of the gas diffusion electrode above the electrolyte constitutes at least 1% of the total surface area of the electrode.

7. An electrochemical cell as claimed in claim 6, wherein the surface area of the gas diffusion electrode above the electrolyte level is within the range of 1–15% of the total surface area of the electrode.

8. An electrochemical cell as claimed in claim 1, wherein the gas diffusion electrode is provided with a catalyst only on external surface portions which are disposed under the electrolyte surface.

9. An electrochemical cell as claimed in claim 1, wherein said cell housing contains a hydrogen-oxygen catalyst in contact with the gas above the electrolyte.

10. A gas diffusion electrode for an electrochemical cell, comprising, an external surface provided with both a catalyst for converting gas to electricity and an electrically conductive material, an internal surface being provided with a hydrophobic material, the hydrophobic material being a cohesive porous plastics layer having pores impermeable to liquid and permeable to gas, a gas space totally sealed about its periphery being defined inside the electrode, said gas diffusion electrode permitting gas to diffuse from and to said sealed gas space and preventing entry of water or electrolyte into the gas space.

11. A gas diffusion electrode as claimed in claim 10, wherein the peripherally totally sealed gas space is formed as a pocket totally sealed about its periphery, walls of the pocket being sheets of the hydrophobic porous plastics material, the walls being separated by spacer elements.

12. A gas diffusion electrode as claimed in claim 10, wherein said gas space is defined by a porous body which is coated on an exterior surface with the hydrophobic, porous plastics material.

13. A gas diffusion electrode as claimed in claim 12, wherein the porous body has greater sized pores than the pores in the exterior porous plastics material.

14. A gas diffusion electrode as claimed in any one of claims 10-13, wherein the electrode has gradually increasing hydrophobicity from one end to the other.

15. The electrochemical cell as claimed in claim 6, wherein the portion of the gas diffusion electrode above the electrolyte constitutes at least 5% of the total surface of the electrode.

16. The electrochemical cell as claimed in claim 6, wherein the portion of the gas diffusion electrode above the electrolyte constitutes at least 10% of the total surface area of the electrode.

17. The electrochemical cell as claimed in claim 7, wherein the surface of the gas diffusion electrode above the electrolyte level is within the range of 10% to 15% of the total surface area of the electrode.

18. The electrochemical cell as claimed in claim 1, wherein the electrochemical cell is a metal/oxygen battery, a fuel cell or a metal oxide/hydrogen battery.

* * * * *

UNITED STATES PATENT AND TRADEMARK OFFICE
CERTIFICATE OF CORRECTION

PATENT NO. : 4,369,235
DATED : January 18, 1983
INVENTOR(S) : Martin Sigurd Olov Bursell It is certified that error appears in the above-identified patent and that said Letters Patent are hereby corrected as shown below:

On the title page Insert:

--[30]     Foreign Application Priority Data

June 25, 1979 [SE] Sweden ................7905559 --

Signed and Sealed this

Twenty-ninth Day of March 1983

[SEAL]

Attest:

GERALD J. MOSSINGHOFF

Attesting Officer      Commissioner of Patents and Trademarks